US012427352B2

(12) United States Patent
Murray

(10) Patent No.: US 12,427,352 B2
(45) Date of Patent: Sep. 30, 2025

(54) AEROSOL FIRE SUPPRESSION MATERIALS, SYSTEMS AND METHODS OF IMPLEMENTATION

(71) Applicant: Donald A. Murray, Green Bay, WI (US)

(72) Inventor: Donald A. Murray, Green Bay, WI (US)

( * ) Notice: Subject to any disclaimer, the term of this patent is extended or adjusted under 35 U.S.C. 154(b) by 1074 days.

(21) Appl. No.: 17/389,539

(22) Filed: Jul. 30, 2021

(65) Prior Publication Data

US 2022/0016459 A1 Jan. 20, 2022

Related U.S. Application Data

(63) Continuation-in-part of application No. PCT/US2020/047527, filed on Aug. 21, 2020.

(Continued)

(51) Int. Cl.

*A62C 35/10* (2006.01)
*A62C 37/40* (2006.01)
*A62C 37/48* (2006.01)
*A62C 99/00* (2010.01)
*A62C 3/16* (2006.01)

(52) U.S. Cl.

CPC .............. *A62C 35/10* (2013.01); *A62C 37/40* (2013.01); *A62C 37/48* (2013.01); *A62C 99/0018* (2013.01); *A62C 3/16* (2013.01)

(58) Field of Classification Search

CPC ......... A62C 37/40; A62C 37/48; A62C 35/10; A62C 35/13; A62C 3/16; A62C 3/0257; A62C 99/0018; A62C 8/06; A62C 99/0045

See application file for complete search history.

(56) References Cited

U.S. PATENT DOCUMENTS 3,711,115 A 1/1973 Lohr
3,782,475 A 1/1974 Schmidt (Continued)

FOREIGN PATENT DOCUMENTS

CN 109256502 A 1/2019
CN 107670206 A 12/2022

(Continued)

OTHER PUBLICATIONS

Wikipedia Article Titled "de Laval nozzle".

*Primary Examiner* — Christopher R Dandridge
(74) *Attorney, Agent, or Firm* — Douglas B Teaney; CARDINAL LAW GROUP

(57) ABSTRACT

Fire protection and suppression apparatus, materials, systems, and methods of use thereof are disclosed. In fire extinguishing applications, aerosol extinguishing agent in sheets, panels or other forms can be placed in a variety of implementations, including one or more of, but not limited to, inside an enclosure that contains a fire hazard, in an interior of a fire hazard itself, incorporated into a structure of a fire hazard. Once initiated, the aerosol extinguishing material will burn to create and directly disperse the aerosol particulate that can extinguish the fire. Initiation of the aerosol agent can be by flames or heat from an unwanted fire. Alternative methods of initiation include electric initiators that are signaled by automatic fire detection systems, electric manual methods, or mechanical/thermal initiators.

7 Claims, 6 Drawing Sheets

Related U.S. Application Data

(60) Provisional application No. 63/004,828, filed on Apr. 3, 2020, provisional application No. 62/891,707, filed on Aug. 26, 2019.

(56) References Cited

U.S. PATENT DOCUMENTS

| | | | | |
|---|---|---|---|---|
| 5,492,180 | A | 2/1996 | Spector et al. | |
| 5,857,627 | A | 1/1999 | Horwell et al. | |
| 6,983,805 | B2 * | 1/2006 | Chattaway | A62C 8/06 169/36 |
| 8,844,644 | B2 | 9/2014 | Guo et al. | |
| 10,864,395 | B2 | 12/2020 | Murray et al. | |
| 2004/0262017 | A1 | 12/2004 | Gaidano et al. | |
| 2010/0032501 | A1 | 2/2010 | Tarnogrodzki et al. | |
| 2010/0139931 | A1 * | 6/2010 | Guenthner | A62C 2/065 169/48 |
| 2011/0036600 | A1 | 2/2011 | Zhang et al. | |
| 2011/0226492 | A1 | 9/2011 | Tagliareni et al. | |
| 2012/0034482 | A1 | 2/2012 | Zeliff | |
| 2012/0285710 | A1 * | 11/2012 | Umehara | A62C 5/006 169/56 |
| 2013/0134233 | A1 | 5/2013 | Woo et al. | |
| 2013/0292140 | A1 | 11/2013 | Inoue et al. | |
| 2014/0196916 | A1 | 7/2014 | Lee et al. | |
| 2015/0017491 | A1 | 1/2015 | Specht et al. | |
| 2016/0107010 | A1 | 4/2016 | Cordani | |
| 2016/0346577 | A1 | 12/2016 | Ito | |
| 2017/0113080 | A1 | 4/2017 | Specht et al. | |
| 2018/0087272 | A1 | 3/2018 | Vandemark et al. | |
| 2018/0117376 | A1 * | 5/2018 | El-Sheikhy | A62D 1/005 |

FOREIGN PATENT DOCUMENTS

| | | | |
|---|---|---|---|
| JP | H06 269513 | A | 9/1994 |
| JP | 2019033123 | A | 2/2019 |
| RU | 53921 | U | 6/2006 |
| WO | WO9315793 | | 8/1993 |
| WO | WO 2011/161792 | A1 | 12/2011 |
| WO | WO2018071309 | A1 | 4/2018 |

* cited by examiner

AEROSOL FIRE SUPPRESSION MATERIALS, SYSTEMS AND METHODS OF IMPLEMENTATION

BACKGROUND OF THE INVENTION

This bypass application is a continuation-in-part of international patent application no. PCT/US2020/047527 filed 21 Aug. 2020 and claims priority under 35 U.S.C. § 120 and 37 CFR § 1.78(d) of the international filing date, which in turn claims benefit of the filing dates of U.S. Ser. No. 62/891,707 filed 26 Aug. 2019 and U.S. Ser. No. 63/004,828 filed 3 Apr. 2020, respectively, the complete contents of all of the foregoing are hereby expressly incorporated herein in their entireties.

TECHNICAL FIELD

The invention relates to fire protection and suppression apparatus, materials, systems, and methods of use thereof, for use in compartments and enclosures, amongst other locations.

The invention relates to employing an aerosol fire extinguishing agent in a simplified installation that simplifies the installation, reduces space requirements, reduces weight, and saves cost on both the extinguishing components and the installation.

More particularly, the invention relates, in part, to a solid aerosol fire extinguishing agent formed in panels, sheets or various shapes, as a material inserted in the void spaces within a hazard, as a material that is used to form the structure or components of the hazard, or as a coating so that it can be employed in compartments or enclosures without the need for significant housings or containers.

BACKGROUND OF THE INVENTION

In North America, reference is commonly made to four classes of fire: A, B, C and D. Other regions, such as Europe, may have similar approaches, but with differing nomenclatures.

CLASS A is the burning of common combustibles, such as wood, paper, etc.

CLASS B is the burning of flammable liquids, such as alcohol, gasoline, etc.

CLASS C is an "electrical fire" but some clarification is required.

While electricity does not burn per se, it is the ignition source. What burns is materials that have behaviors as Class A materials and/or Class B materials with electrical insulation made with plastic type products being typical. The Class A fire behavior arises from bundles or electrical wires where it becomes problematic to get a fire agent penetrate sufficiently deep into the wire bundle as would be required if the burning cable was in the center of a bundle. Class B fire behavior arises when plastic melts before it starts to burn.

If a fire starts with electricity as the ignition source, there are two scenarios:

1. If power is shut off, either automatically or manually, then the "de-energized" fire becomes an A or B class fire or both. It is still important to recognize that plastics can have both A and B behavior.
2. If the power is not shut off, then it is an energized electrical fire which is far more difficult to extinguish because the ignition source is still present. Some electrical fires may not be extinguished until the power is removed.

An energized electrical fire can be extremely dangerous because extinguishment is difficult if not impossible; and a shock hazard exists.

As of the time of this writing, Underwriters' Laboratories™ rates extinguishers with their A, B, C, and/or D listing according to the type of fire the extinguisher may be used on. The "C" listing simply means that the extinguishing agent is not normally conductive (electricity will not flow back to the operator of the extinguisher through the extinguisher discharge stream). This is not a certification as to the effectiveness of the extinguisher on any energized electrical fire.

CLASS D is a combustible metal fire. Magnesium, very fine aluminum, etc.

Fire Suppression Terminology

Fire Retardant

A fire retardant is applied to slow the growth of a fire. Normally, it would make the fuel less combustible.

For example:

In fighting a forest fire, airplanes will drop large quantities of water in front of a progressing forest fire, and commonly, the water has a chemical additive which will make the trees, shrubs on the ground less combustible. This slows the progression of the fire. Although the water dropped could extinguish the fire if the fire was directly targeted, the main job is containment. Also, it would take much more water from the aircraft to extinguish a forest fire and the available water is simply more effective if the spread of fire is stopped.

Normally, a fire retardant is employed to slow a fire's progress, not to extinguish it.

Fire Suppressant

The term "fire suppressant" can lead to confusion. It indicates that an agent will suppress a particular fire but not necessarily extinguish it. Of course, the real goal is to extinguish fire but the best one may achieve with a particular agent on a particular fire is to lessen or slow the fire. In other words, on some applications extinguishment is achieved, and on other applications, it is not.

Some fire extinguishing system manufacturers have advertised their products as "fire suppression systems" because extinguishing is not always accomplished. This may be done as a product liability control measure, by avoiding calling their products an "extinguishing system". However, as customers are really looking to obtain an "extinguishing system", prospective purchasers should be wary of the term "suppression system" or should carefully review the agent capabilities on their application.

A good and common example would be halocarbon gaseous agents on Class A fires.

If the Class A materials burning are light such as writing paper on a desk or a waste basket fire, the system will likely extinguish these fires. Alternatively, if the Class A burning materials are knocked-down cardboard packing boxes on a shelf, the halocarbon agent could have considerable trouble penetrating to the fire area inside these materials and the fire will not be extinguished—only suppressed. Therefore the maker of the fire protection system will call his system a suppression system.

Fire Extinguishing Agent

A fire extinguishing agent will extinguish a fire.

These systems will be far better than a fire retardant or a fire suppression agent.

To address fire hazards, such as battery fire hazards:

Because of the violence of a battery fire and the difficulty in achieving extinguishment, fire retardants and fire suppression agents must be avoided. The only systems that make sense are those capable of rapid extinguishment and holding the fire out until the hazard has cooled to terminate the runaway hazard.

Types of Extinguishers

There is no one universal agent (although aerosol comes close). "Traditional" agents used for the respective fire classifications are:

Class A water, multi-purpose dry chemical

Class B foam, dry chemicals, carbon dioxide

Class C multi-purpose dry chemical, carbon dioxide

Class D special dry powders (similar to sand)

Li-Ion Battery Fires

Because of the increasing prevalence of the use of batteries, such as Li ion batteries, e.g., in electric vehicles, there is increased interest in enhancing the safety of operation of such battery-based power systems. There are several versions of Li-ion style batteries with a variety of technologies but this "family" of batteries all present similar fire extinguishing challenges.

A Li-ion battery fire is unique because it can present Class A, B, C, and D fires all in one.

The major hazard problem is the energy stored. Other hazard elements are the flammable electrolyte which can be capable of producing its own oxygen in a fire, the highly combustible lithium metals and packaging materials.

A few things are especially notable when thinking about Li-ion battery fire extinguishment:

- the batteries can have very high energy storage;
- the start of a fire or explosion can be largely unpredictable;
- the development of fire or explosion is extremely rapid with sometimes only a few seconds between initiation and explosion or uncontrollable fire;
- There are two "phases" to the problem:
- destructive opening of the package and start of fire/explosion;
- rapid uncontrolled heating of the remains of the battery and rapid thermal exposure to adjoining batteries and spread of fire/explosion;
- traditional fire extinguishing agents do not work; and
- water does not work well as an extinguishing agent, but huge amounts of water may be able to cool the hazard end eventually terminate the fire.

With respect to the use of aerosols in fire suppression and extinguishment, there have been thin metal panels containing dry chemical extinguishing powders placed around fuel tanks of automobiles so that if the vehicle is rear-ended, with the possibility that the fuel tank is ruptured, the panels containing the extinguishing agent will also be ruptured thus dispersing the dry powder agent to prevent or extinguish fire. Some of the Ford Crown Victoria police vehicles have had these dry chemical agent panels installed with successful fire suppression in both testing and actual accidents. The US military has also installed similar panels on armored vehicles to protect wheel-wells, etc. Aerosol agents have not been used in these applications.

The dry chemical agents, typically made with sodium bicarbonate or potassium bicarbonate, are stored and discharged as a fine powder with a typical diameter of their particulate being 25 microns. When these powders enters a flame, they extinguish primarily by interrupting the chemical reaction of the fire.

Aerosol agents, typically made with a fuel (such as epoxy resin) mixed with an oxidizer (such as potassium nitrate) are a solid combustible material that will burn when exposed to flame or high heat. The products of combustion are a fine aerosol sized particulate with much smaller diameter (less than 10 micron and with diameter under 2 micron being common) and a less significant quantity of nitrogen and other gases.

The National Fire Protection Association (NFPA Standard 2010 Standard for Fixed Aerosol Fire-Extinguishing Systems, Section 3.3.2.1) defines a "condensed aerosol" as follows:

"An extinguishing medium consisting of finely divided solid particles, generally less than 10 microns in diameter, and gaseous matter, generated by a combustion process of a solid aerosol forming compound." This is a refinement of the more commonly-understood meaning of a "very" finely-divided solid or liquid particulate material.

According to embodiments of the invention, the condensed aerosol material as implemented occupies two states: a solid state (being the compound or precursor material, in the form of a rigid or semirigid panel, a flexible sheet, a block (such as a rectangular parallelepiped), a three-dimensional solid (such as a tetrahedron or a cone), etc., which creates a fire-suppressing aerosol subsequent to ignition; and a generated aerosol state comprising finely divided solid or liquid particles, subsequent to ignition.

This fine aerosol particulate also extinguishes fire by interrupting the chemical reaction of the fire and it provides much more rapid extinguishing performance because the small diameter greatly increases the surface area of the agent particulate allowing the particulate to react in the flame very quickly compared to other agents.

Because of the combination of the agent using the chemical interruption mechanism along with the ability to react rapidly in the flame, the agent is significantly more efficient compared to other agents resulting in much less agent being required.

SUMMARY OF THE INVENTION

Embodiments of the invention comprise a fire suppression system, comprising:

at least one of:

an enclosure comprising at least one enclosure wall and defining an internal volume; and an internal partition structure separating the internal volume into at least two discrete sub-volumes;

at least one of the at least one enclosure wall and the internal partition structure fabricated from a matrix comprising an aerosol fire suppression material and a combustible base material.

Panels, sheets, different shapes and coatings of solid or flexible condensed aerosol fire extinguishing materials can be ignited by fire or heat in order to discharge a fine particulate/gaseous agent that extinguishes fire.

These condensed aerosol agents are particularly useful on difficult fires such as lithium-ion battery fires because of the ability of the discharged agent to interrupt the chemical chain reaction of the fire. With this extinguishing mechanism, the amount of agent required is significantly reduced.

Additionally, because the extinguishing particulate is fine, the resulting surface area of the agent is large which allows very rapid reactions in the flame thus making the aerosol agent perform extinguishment very rapidly.

Panels, sheets, different shapes and coatings are also an improvement over the canister style of aerosol generator because they are self-contained and provide both the detection of a fire and the actuation of the condensed extinguishing sheets, panels, different shapes and coatings, and further, they offer improved distribution of the extinguishing agent in obstructed enclosures.

The invention comprises, in part, a fire suppression system for use on enclosures for fire hazards, comprising a panel of condensed aerosol fire suppression material, having a first enclosure-facing side, and a second hazard-facing side; a fire-resistant material disposed proximate the first enclosure-facing side; and a sealant material disposed on the second hazard-facing side.

Panels can also be used "naked," that is, without attachment to enclosures, without ceramic paint, adhesive, sealants, etc. For example, if someone is filling a box with new batteries or laptop computers for shipment on trucks or airplanes, it would be possible for the person doing the packing to insert simple panels of solid aerosol into the shipping box without attaching them to the box. Such panels may not require any adhesive, sealant, ceramic.

In an embodiment of the invention, the fire suppression system further comprises an insulation layer disposed between the first enclosure-facing side and the fire-resistant material.

In an embodiment of the invention, the fire-resistant material comprises a ceramic paint.

In an embodiment of the invention, the panel further comprises at least one lateral side extending between the first enclosure-facing side and the second hazard-facing side. The fire-resistant material may be disposed on the at least one lateral side.

In an embodiment of the invention, the fire suppression system further comprises an adhesive region disposed on an enclosure-facing side of the fire-resistant material. The adhesive region may comprise a layer of adhesive material disposed on the enclosure-facing side of the fire-resistant material, and a removable layer of protective material covering the layer of adhesive material.

In embodiments of the invention, a fire suppression system comprises an aerosol material disposed on, or in physical proximity to, a potential fire hazard, wherein the aerosol material is configured to be actuated by exposure to at least one of heat or flame, and wherein the aerosol material is in the form of at least one of: a body of material impregnated with an aerosol fire suppression substance; a coating applied to a surface on, or in physical proximity to, the potential fire hazard. In an embodiment of the invention, the body of material is one of flexible, rigid, a combination thereof; and has a shape that is one of a cylinder, a pyramid, a prism, a rectangular parallelepiped, a sphere, an irregular shell, a combination thereof; and is one of hollow, solid-through, solid but porous throughout; a combination thereof.

The panels can be provided for installation on the enclosure, or as partitions or dividers in the enclosure to separate sections of the hazardous materials, and/or installed on the hazardous materials, or internal to the hazard such as within the spaces inside a battery module made with multiple cells. In embodiments of the invention, partitions or dividers would be used in shipments of batteries or electrical devices in their boxes inside a larger box or package.

In an embodiment of the invention, the aerosol material preferably is similar to a plastic in terms of its mechanical properties and therefore, the structure or certain components of a hazard can be fabricated out of the aerosol materials. The aerosol material can be formed, stamped, molded and machined to provide suitable components and provide necessary components for the hazard while being available as a fire extinguishing agent in the event of a fire. This provides an added mechanism by which the fire extinguishing agent is brought as close as possible to the hazard as it becomes integral to the hazard.

In embodiments of the invention, the aerosol fire suppression substance comprises at least one of potassium nitrate; potassium carbonate; epoxies or organic resins; dicyandiamide (DCDA); magnesium; or similar materials that constitute a fuel and an oxidizer. In preferred embodiments of the invention, the aerosol material will not include strontium in any form or composition, due to concerns regarding potential adverse health impacts.

In embodiments of the invention, the aerosol material further comprises a plurality of layers of aerosol fire suppression substance. The plurality of layers may comprise at least two layers, and further wherein the aerosol fire suppression substance of a first layer is different from an aerosol fire suppression substance of a second layer.

In embodiments of the invention, the fire suppression system further comprises an initiator operably coupled to the aerosol material to facilitate actuation of the aerosol fire suppression substance.

In embodiments of the invention, the fire suppression system further comprises a fire detector operably coupled to the initiator, to actuate the initiator, upon detection of at least one of heat in excess of a predetermined temperature, flame, combustion products in excess of a predetermined concentration, combustion products having at least predetermined constituent.

In embodiments of the invention, the fire suppression system further comprises a control apparatus coupled to the initiator and the aerosol material.

In embodiments of the invention, the control apparatus comprises a manual actuator to enable the initiator to be selectively actuated by a person.

In embodiments of the invention, the fire suppression system further comprises a fire detector operably coupled to the initiator, and the control apparatus, to actuate the initiator, upon detection of at least one of heat in excess of a predetermined temperature, flame, combustion products in excess of a predetermined concentration, combustion products having at least predetermined constituent. In an embodiment of the invention, the fire hazard comprises at least one of a device and a process system, and the control apparatus is coupled to a monitoring apparatus that monitors operation of the device. Such a device could be a battery or bank of batteries in a vehicle or a facility. Alternatively, the process system could be any type of manufacturing or operational system, wherein the risk of fire is particularly salient.

In an embodiment of the invention, the aerosol material is in the form of a body of material impregnated with an aerosol fire suppression substance, and wherein a layer of protective material is disposed on a side of the body to be positioned facing a fire hazard, the layer of protective material being disposed in a pattern such that portions of the body of material impregnated with aerosol fire suppression substance is exposed.

The aforementioned and other features and advantages of the invention will become further apparent from the following detailed description of the presently preferred embodiments, read in conjunction with the accompanying drawings, which are not to scale. The detailed description and drawings are merely illustrative of the invention, rather than limiting, the scope of the invention being defined by the appended claims and equivalents thereof.

DETAILED DESCRIPTION OF THE DRAWINGS

Figure 1:
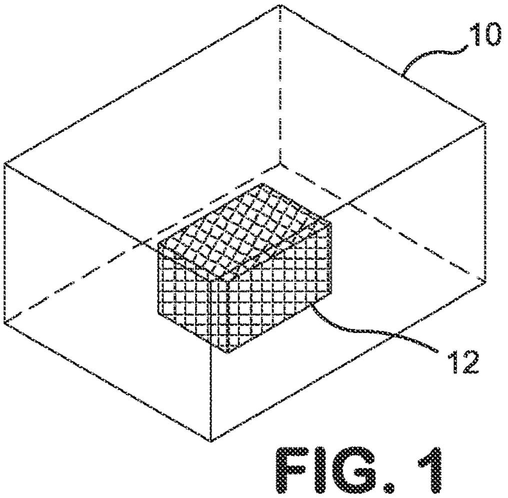
FIG. 1 is a schematic illustration of a representative enclosure in which a potential fire hazard is disposed.

While this invention is susceptible of embodiment in many different forms, there are shown in the drawings and described in detail herein, specific embodiments, with the understanding that the present disclosure is to be considered as an exemplification of the principles of the invention and is not intended to limit the invention to the embodiment(s) illustrated.

The invention and accompanying drawings will now be discussed in reference to the numerals provided therein to enable one skilled in the art to practice the present invention. The drawings and descriptions are exemplary of various aspects of the invention and are not intended to narrow the scope of the appended claims. Unless specifically noted, it is intended that the words and phrases in the specification and the claims be given their plain, ordinary, and accustomed meaning to those of ordinary skill in the applicable arts. It is noted that the inventors can be their own lexicographers. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f) or pre-AIA 35 U.S.C. § 112~6. Thus, the use of the words "function," "means" or "step" in the Detailed Description of the Invention or claims is not intended to somehow indicate a desire to invoke the special provisions of 35 U.S.C. § 112(f) or pre-AIA 35 U.S.C. § 112~6 to define the invention. To the contrary, if the provisions of 35 U.S.C. § 112(f) or pre-AIA 35 U.S.C. § 112~6 are sought to be invoked to define the inventions, the claims will specifically and expressly state the exact phrases "means for" or "step for" and the specific function (e.g., "means for roasting"), without also reciting in such phrases any structure, material, or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f) or pre-AIA 35 U.S.C. § 112~6. Moreover, even if the provisions of 35 U.S.C. § 112(f) or pre-AIA 35 U.S.C. § 112~6 are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and apparatus are shown or discussed more generally in order to avoid obscuring the invention. In many cases, a description of the operation is sufficient to enable one to implement the various forms of the invention, particularly when the operation is to be implemented in software.

It should be noted that there are many different and alternative configurations, apparatus, and technologies to which the disclosed inventions may be applied. Thus, the full scope of the inventions is not limited to the examples that are described below.

Various aspects of the present invention may be described in terms of functional block components and various processing steps. Such functional blocks may be realized by any number of hardware or software components configured to perform the specified functions and achieve the various results.

Thus, while there are disclosed improved apparatus, systems, and methods for effectuating the generation and dispersion of pyrotechnically-generated fire suppression substances, it will be understood that references in the following disclosure to systems and apparatus are also applicable to other fire suppression apparatuses and methods, which utilize related structures for the processes recited. Similarly, references to methods are also applicable of systems and apparatus, which perform the processes in the operation of the recited apparatus. It will be appreciated that numerous changes may be made to the present invention without departing from the scope of the claims, including but not limited to combinations of elements or structures of the various illustrated embodiments. For example, while specific materials and/or methods of manufacture of the apparatuses described herein may be discussed, it is understood that one having ordinary skill in the art may select different materials and/or methods of manufacture, as desired or necessary to meet the requirements of a particular application, without departing from the scope of the present invention.

FIGS. 1-7, for example, discuss embodiments of the invention, wherein a pyrotechnic aerosol fire suppression agent, which may be released through exposure to heat and/or flame, is provided in the form of a body of material that is impregnated with the pyrotechnic aerosol agent, in an embodiment, in the form of sheets. Such sheets may be strategically placed on or in the vicinity of a potential fire hazard. The aerosol agent panels (sheets, coatings, etc.) would be especially suitable when there is limited space for other aerosol extinguishing systems or when there are significant obstructions to the distribution of the agent. Alternatively, the aerosol agent sheet or coating may be provided as a supplement to a pyrotechnic fire suppression agent dispersed via nozzle.

Although the material having fire suppression agents impregnated therein is described and illustrated herein as being in the form of sheets, other geometric configurations are also possible and considered to be within the scope of this invention. Such alternative configurations of the body of impregnated material may include, but are not limited to: one of flexible, rigid, a combination thereof; and a shape that is one of a cylinder, a pyramid, a prism, a rectangular parallelepiped, a sphere, an irregular shell, a combination thereof; and one of hollow, solid-through, solid but porous throughout; a combination thereof. Also, for purposes of the present disclosure, references to "aerosol material" is meant to refer to materials, and/or mixtures or compositions of materials, which are embedded or impregnated into a binder material, including but not limited to an epoxy resin material. A summary of the operation of aerosol fire suppression agents is as follows:

a) The condensed agent (before being ignited) is typically a solid material (but could also be a liquid or slurry) that is mainly comprised of a fuel (which can be an epoxy resin) and an oxidizer (such as potassium nitrate). This is analogous to other pyrotechnic materials which can include fireworks, munitions, airbag inflators, etc.)

b) Once the material is ignited, the burning is greatly accelerated by the oxidizer. The speed of burning determines whether a fire extinguishing agent is generated over a few seconds or a bomb which is burned instantly to achieve an explosive effect.

c) A fire extinguishing aerosol agent results from the burning of the condensed agent. Typically, the solid pellet produces the actual aerosol (which typically may present as a white smoke) in the form of an ultra-fine particulate along with some gaseous by-products which can include nitrogen and other gases.

d) In a normal target fire to be extinguished, the burning fuel produces chemical radicals that link up to the oxygen from the air to provide an exothermic reaction to maintain combustion.

e) The target fire continues to burn unless one or more of the following events happen:

1. the oxygen is removed (e.g., a CO2 fire extinguisher is used)
2. the fire is cooled (a water sprinkler or water hose is used)
3. the fuel is removed (a gas jet fire from a leaking pipe stops when the valve supplying the fuel is shut)

f) pyrotechnic aerosol fire suppression systems do not use any of the three "traditional" methods described above. The particulate generated as the aerosol fire suppression agent is potassium based. When the very fine particulate enters the flame of the target fire, the radicals of the fuel, which would normally link to oxygen, instead preferentially link to the potassium radicals provided from the aerosol agent. Because the new compounds created via the potassium radicals are stable, and do not burn and thus the target fire is extinguished.

g) To reiterate, the oxygen from the room, which normally surrounds the fire and is necessary to allow the target fire to keep burning, is still present. Pyrotechnic aerosol fire suppression agents do not reduce the oxygen available to the fire. Instead, the target fire's fuel radicals have a greater affinity for the potassium radicals generated via the pyrotechnic than for the ambient atmospheric oxygen. Accordingly, while oxygen is still present the target fire is extinguished because oxygen is excluded by the presence of the potassium.

FIG. 1 is a schematic illustration of a representative enclosure 10 in which a potential fire hazard 12 is disposed. The hazard to be protected may comprise, for example, a containment, which may be substantially leak-proof, which may have minor leakage, and which represents a potential fire hazard. The fire hazard is in the enclosure. The class of fire can be Class A (ordinary combustibles), Class B (flammable liquids), class C (electrical fires), Class D (combustible metals such as lithium), or materials that burn without the need for atmospheric oxygen such as certain electrolytes in lithium-ion style batteries.

Figure 2:
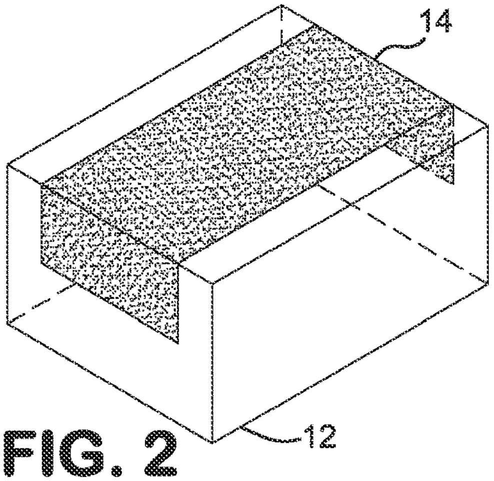
FIG. 2 is a schematic illustration of an aerosol product according to an embodiment of the invention, shown disposed on the enclosure of a fire hazard illustrated in FIG. 1.

FIG. 2 is a schematic illustration of an aerosol product 14 according to an embodiment of the invention, shown disposed on the fire hazard 12 illustrated in FIG. 1. Aerosol agent, formed from sheets, panels or other shapes can be fitted within the enclosure 10. The amount of agent and placement is dependent on the volume, available space, leakage, obstructions. In high energy hazards, the unwanted fire would have enough energy, flames and/or heat to initiate the combustion of the aerosol agent. In this most simple arrangement, there is no requirement for fire detection and the actuation of the fire extinguishing capability is automatic.

The agent formulation for the “solid aerosol forming compound” is an energetic material. Energetic materials typically consist of a fuel and an oxidizer. The speed of the combustion is determined by the selection of materials. Very rapid burning is considered an explosion. Slow burning formulations are used by fire protection makers for the solid aerosol forming compound. Considering the solid aerosol forming compound, the fuel used is typically an epoxy resin, and the oxidizer is typically potassium nitrate or similar oxidizer. More fully stated, typical materials that may be used in the make-up of an aerosol pellet (used in a pyrotechnical generator) or on an impregnated sheet include but are not limited to one or more of the following: potassium nitrate; potassium carbonate; epoxies or organic resins; dicyandiamide (DCDA); magnesium. As between potassium nitrate and potassium carbonate, while potassium carbonate is a strong oxidizer, it is subject to shock, and thus potassium nitrate is considered safer and more stable. As such, for purposes of the instant invention, potassium nitrate would be considered to be a safer material, particularly for implementation in or adjacent to fire hazards which may be subject to movement, shocks, vibrations, etc.

When configuring a pyrotechnical generator or impregnated sheet, various factors may be taken into consideration in determining the rate of production of the fire suppressing aerosol, including but not limited to: the specific chemical composition; the surface area of the sheet or the nozzle area and/or chamber volume in the case of a generator, shape and/or thickness of a sheet or panel; the use of inhibiting coatings (on the sheet, panel or generator pellets) such as a ceramic “paint.”

In addition, in embodiments of the invention, wherein a substantial quantity of epoxy resin is used to provide a self-supporting body to carry the aerosol-generating material, rather than relying upon an external frame or holder to support the aerosol-generating material, the resin may have an effect on the rate of combustion, potentially slowing the combustion to the point of self-extinguishment. Accordingly, combustion regulating or enhancement materials, such as magnesium, aluminum or similar materials, in powder or flake form for example, may be dispersed within the resin.

Figure 3:
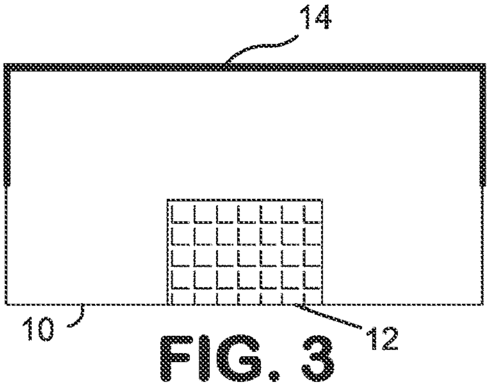
FIG. 3 is a schematic illustration of an alternative embodiment of the invention, illustrating alternative placement of aerosol product.

FIG. 3 is a schematic illustration of an alternative embodiment of the invention, wherein the aerosol product 14 is placed on a container, housing, enclosure, etc., 10, which contains the hazard 12.

Figure 4:
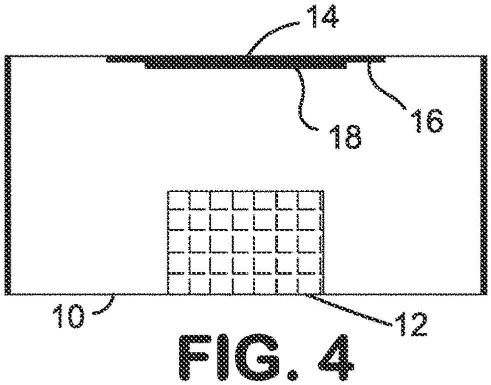
FIG. 4 is a schematic illustration of an alternative embodiment of the invention, illustrating deployment of the aerosol product in layers or different shapes.

FIG. 4 is a schematic illustration of an alternative embodiment of the invention, illustrating alternative placement of aerosol product 14, or example as a plurality of layers 16, 18. More layers may be provided, if desired. For example, the shapes in which the aerosol product may be embodied include panels, sheets, blocks, strips and bars. The aerosol agent in the aerosol product 14 can be arranged to best suit the enclosure 10 and the fire hazard 12. Once initiated, all the aerosol agent will actuate because of the energy of the aerosol materials. Nearby aerosol agent will start to burn to produce the extinguishing agent even when the installed aerosol agent sheets/panels or forms are not in contact with each other. Alternatively, Further, the layers 16, 18 may be fabricated using different aerosol materials, such as might deploy at different temperatures, to suit the nature of the particular fire hazard 12 in question.

Figure 5:
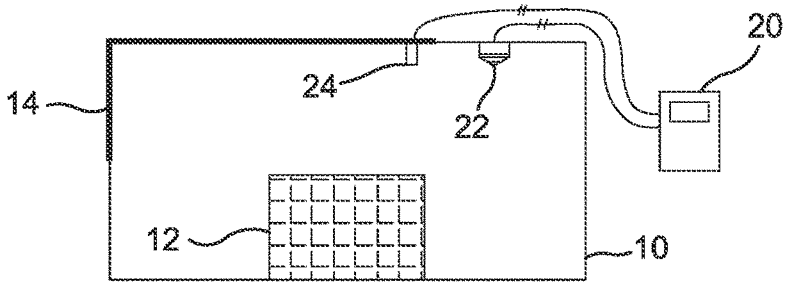
FIG. 5 is a schematic illustration of an alternative embodiment of the invention, illustrating deployment of aerosol agent on an enclosure, and further illustrating an exemplary control, detection, and initiation system.

FIG. 5 is a schematic illustration of an alternative embodiment of the invention, illustrating deployment of the aerosol product 14 in combination with detection and actuation systems. In addition to being self-initiating when there is significant flame or energy from a fire, the aerosol agent materials can be initiated by adding fire detector(s) 22 and electric initiators 24 for use when the fire is not expected to be of the energy required to initiate the aerosol burning, or when added reliability is desired. The fire detection can use smoke, heat, flame detectors and/or automatic or manual actuation control station(s) 20.

In addition to, or as an alternative to, using a fire detection system to actuate the fire suppression aerosol generator or sheets, actuation could also be caused by a signal received from a process monitoring system (not illustrated) provided for monitoring equipment that could potentially catch fire. For example, if a battery compartment, e.g., in a vehicle, is being protected, in addition to a dedicated fire/smoke sensor configured to send a signal to a control apparatus, in addition the battery bank could have a monitoring system that might detect faults in the operation of the battery bank that could correspond to conditions likely to lead to ignition or explosion, but prior to the existence of actual detectable smoke, excessive heat or flame.

These panels, shapes, or coatings 14 can be applied to the ceiling/top, walls, and floor/bottom of an enclosure 10, such as, but not limited to, a battery enclosure, to disperse the agent directly into the enclosure/room once the agent is ignited. If the enclosure is one that has active ventilation (e.g., blowers) that does not shut down during smoke or fire events, or which cannot be shut down, or in situations where there are fixed openings (like ventilation louvers), or situations where the integrity of the enclosure might be rapidly compromised by the smoke/heat/fire event, one skilled in the art, using routine design and engineering practice may increase the amount of aerosol agent to address the potential loss or misdirection of activated aerosol material, that might occur as a result of such compromise factors.

The agent combustion that creates the extinguishing aerosol can be initiated directly by the flames or high-heat of a fire. The agent combustion can also be initiated by various fire detection systems 20, 22, 24, employing heat, smoke or flame sensors, or manual actuation stations to electrically operate an initiator fitted to the aerosol agent. Other types of initiators would be thermally actuated or mechanical types that would use the temperature increase in the compartment or manual mechanical means to operate an initiator.

Figure 6:
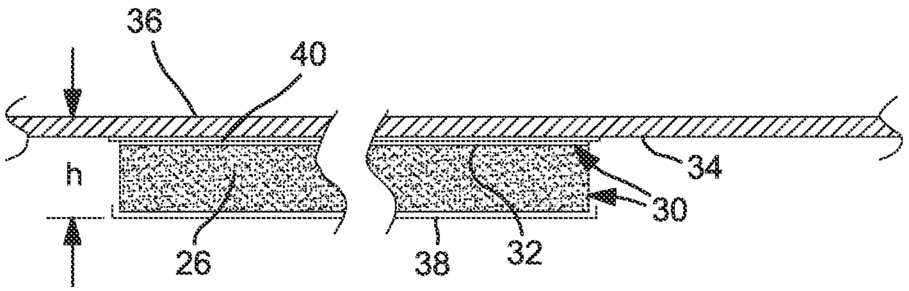
FIG. 6 is a schematic illustration of an embodiment of the invention, showing a particular aerosol panel configuration.
Figure 7:
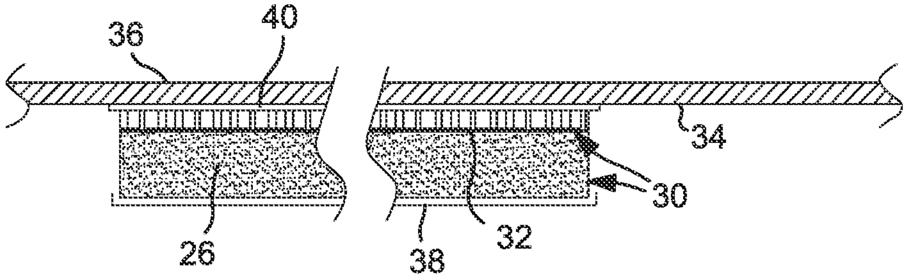
FIG. 7 is a schematic illustration of an embodiment of the invention, showing a particular aerosol panel configuration.
Figure 8:
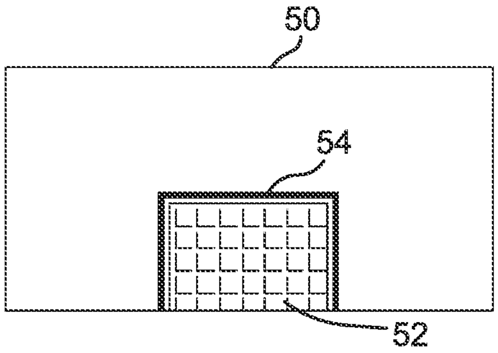
FIG. 8 is a schematic illustration of an embodiment of the invention, illustrating the deployment of an aerosol system, on a fire hazard, within an enclosure.

FIG. 6-7 illustrate additional details for condensed aerosol agents in sheets, panels and coatings are described.

As illustrated in FIG. 6-7, to make the ridged or flexible condensed aerosol panels, sheets, and coatings more practical, a number of improvements and features can be provided.

Thin ceramic paints or coatings 30, or similar fire retardants, can be applied to selected surfaces 32 of the panels, sheets and/or aerosol coatings 26, to be applied to the surface(s) 34 of an enclosure 36 surrounding or containing a fire hazard (not shown). Such materials may be able to tolerate temperatures of 1500 degrees F. or higher for periods of time. These coatings limit the burning of the panels, sheets, and coatings to the areas where the fire-retardant materials are not applied. This provides an improvement in controlling how and where the aerosol material will burn to create the extinguishing agent, and it can also prevent the burning from being too rapid. Very rapid or uncontrolled burning could create excessive pressure which could damage the enclosure of the hazard. Ceramic coatings would normally be considered analogous to a very thin paint layer; however, the specific thickness may be determined by one skilled in the art to accommodate the requirements of a particular implementation. As of the time of this writing, a number of brands and products exist in the industry as potential candidates for ceramic coatings that may be implemented in accordance with the instant disclosure. Certain ceramic paints or coatings can withstand very high heat. This characteristic can be exploited to selectively control or limit the surface area of the solid aerosol agent that is being ignited and burnt. In an embodiment of the invention, a thickness of a typical application of ceramic paint would be above 1 mil (0.001 inch) to 6 mils. Thickness of a ceramic coating would be from 6 mills to 50 mils. One product that is commercially available at the time of this writing would be Cerakote™ C series coatings, such as C-7700 which is nominally rated for up to 1,800° F. (1,000° C.). Another product brand would be 3M™ NEXTEL™ paints and coatings.

Sealant, rubberized coatings, or thin films 38 can be applied over the surface of the aerosol materials to prevent harmful effects of moisture or other corrosive chemicals that may normally be in the area of the condensed aerosol agent material. The advantage is that the aerosol material is protected from environmental contamination that could degrade the agent material and lessen the performance. These added sealants, rubberized coatings or thin films do not prevent the aerosol material from reacting to flame or heat because they are combustible and a flame from the hazard would immediately burn through a sealant, rubberized coating, or thin film to still rapidly actuate the condensed aerosol materials and provide extinguishment. It is also popular to have the sealant to be blended with energetic materials that would start burning faster than the aerosol agent so the sealant not only provides protection for the solid aerosol agent but helps improve the reaction time of the panels to exposed flame. The thickness of a sealant likewise can be varied in accordance with the requirements of a particular implementation by one skilled in the art. In an embodiment of the invention a thin coating of 10 mils (where 1 mil is 0.001 inch) to 100 mils would be considered to be a preferred range, in an embodiment of the invention. Known potential candidates would be materials such as the rubber sealant sold under the brand name FLEX-SEAL™, or similar products from 3M™.

Insulation 40 can be added to the aerosol material to limit the heat transfer from the burning aerosol material to the enclosure or packaging. High performance insulation materials such as ceramic insulation sheets, fabrics, or coatings, can be used. The advantage is that the enclosure or packaging can be made thinner or made of less costly materials and also could be combustible such as fiberglass, plastic, fiberboard, or cardboard containers.

One source of insulation materials deemed appropriate for use in accordance with embodiments of the present invention would be 3M™, which makes an excellent family of high-performance insulation products known as 3M™ NEXTEL™. In accordance with embodiments of the invention, the insulation layer would be provided as a thin fabric or a material fabricated with a configuration and performance characteristics similar to flexible cardboard. This material has been used previously inside aerosol canisters to slow the heat release after discharge to prevent injury but it has not been used to directly prevent the heat of an aerosol agent from being transmitted to an enclosure.

A wide range high performance ceramic insulation products are available to resist thermal transfer. Certain models of 3M's NEXTEL™ or INTERAM™ products are believed to be rated for over 850° C. and they are available as solid structural sheets or non-structural woven fabrics.

If the panels or other shapes are to be mounted on the enclosure or to the hazard, a sprayed-on or brushed-on adhesive can be applied at the time of installation.

Alternatively, adhesive 42 can be added to the back of the aerosol materials in panels, sheets, and coatings in advance of the installation. The advantage is that the adhesive can be pre-applied so that the removal of a film used for packaging would expose the adhesive so that the panels, sheets, and coatings can then be installed more quickly and with less labor. For example, an adhesive layer may be applied and then covered by a removable protective film or release layer (not shown). An example would be double-sided mounting tape, or a layer of adhesive that is pre-applied to a side of the aerosol material and covered with a selectively removal protective layer or strip. One skilled in the art would select an adhesive appropriate to the conditions of the particular implementation; however, adhesive materials marketed by 3M™, or other common adhesives such as Gorilla GIue™ would be considered appropriate for many applications. One selection consideration would be that the chemistry of the adhesive would need to be compatible with the chemistry of the aerosol fuel and oxidizer, such that combustion of the adhesive material would not interfere with the fire-suppression characteristics of the aerosol, would not be toxic in a high heat or flame environment, etc.

FIG. 8-14 illustrate several different applications of aerosol sheets, panels and coatings are described. Condensed aerosol agents in sheets, panels, and coatings 54 can be provided fully or partially:

- in the enclosure 50 by attaching to the inner or outer surfaces of an enclosure per se, or on or as partitions within the interior of an enclosure;
- on hazardous components 52 per se, including components inside an enclosure;
- inside the hazardous components (FIG. 10);
- to make up the structure of the hazardous components.

In addition to condensed aerosol fire extinguishing sheets, panels or coatings being applied to enclosures, boxes, or similar containers, or being used as dividers or separations inside enclosures, the condensed aerosol materials may be used directly near, on, or inside the hazardous materials or assemblies.

Figure 9:
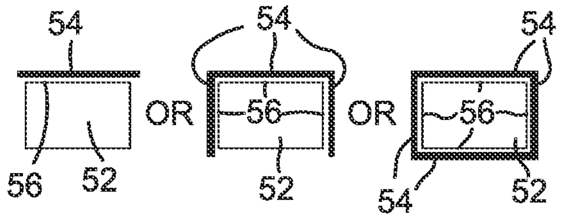
FIG. 9 is a schematic illustration of embodiments of the invention, illustrating modes by which aerosol material may be applied to a fire hazard.
Figure 10:
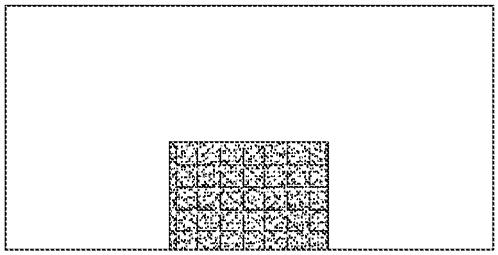
FIG. 10 is a schematic illustration of an embodiment of the invention, wherein the aerosol material is incorporated into the fire hazard.

Aerosol materials in panels, flexible and/or rigid sheets, and coatings can be applied directly on, or in close proximity, to the fire hazard. FIG. 9 illustrates examples of how sheet(s) 54 of aerosol material may be applied to one, or a plurality of sides 56 of a hazard 52.

The condensed aerosol agent material can applied to, on or in close proximity to, one or more surfaces of the hazard or provided in a way that the hazard is partially or fully covered or surrounded by aerosol material in panels, flexible and/or rigid sheets, or coatings.

The advantage is that the time for detection of fire and the actuation of the aerosol extinguishing material can be significantly reduced. Additionally, the extinguishing agent is distributed closer to the fire hazard.

An example would be one or more lithium-ion battery modules which are within a larger enclosure, or complete battery packs. The modules could be protected collectively, as one assembly, or each module could be protected individually.

Further, for added assurance, the larger enclosure containing battery modules, battery packs, or battery cells 60 (FIG. 11-14), could also be provided with aerosol protection with its own aerosol material in panels, sheets, or coating.

Figure 11:
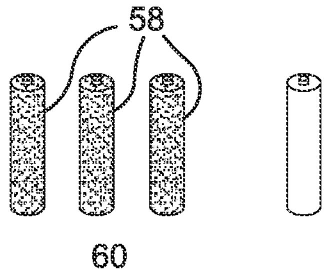
FIG. 11 is a schematic illustration of an embodiment of the invention, demonstrating placement of aerosol material on an exemplary fire hazard, such as individual battery cells.
Figure 13:
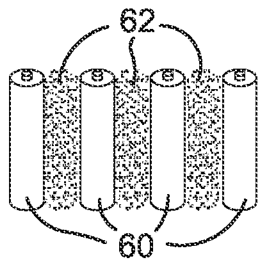
FIG. 13 is a schematic illustration of an embodiment of the invention, demonstrating placement of aerosol material within interstitial spaces between units of an exemplary fire hazard, such as a row of individual battery cells.
Figure 12:
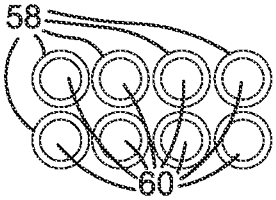
FIG. 12 is a schematic illustration of an embodiment of the invention, demonstrating placement of aerosol material on an exemplary fire hazard, such as grouped individual battery cells.
Figure 14:
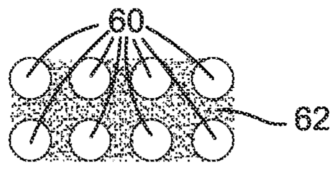
FIG. 14 is a schematic illustration of an embodiment of the invention, demonstrating placement of aerosol material within interstitial spaces between units of an exemplary fire hazard, such as an array of individual battery cells.

In embodiments of the invention, aerosol materials can be applied within the hazard by placing a coating 58 on components of the hazard (as shown in FIG. 11-12) or filling some or all of the void space of the hazard with aerosol material 62 (as shown in FIG. 13-14). With specific reference to FIG. 11, an embodiment of the invention comprises a method for providing protection of potential fire hazards by applying aerosol-generating material directly to the external surfaces of the structures or devices that constitute the actual hazardous material. For example, aerosol material is applied directly to the external surfaces of individual battery cells, prior to their incorporation into collective battery packs holding one or more individual battery cells. The aerosol material may be applied by spraying, dipping, application of a thin sheet of aerosol material, e.g., via an intervening layer of adhesive, or combinations of two or more of these procedures.

Figure 15:
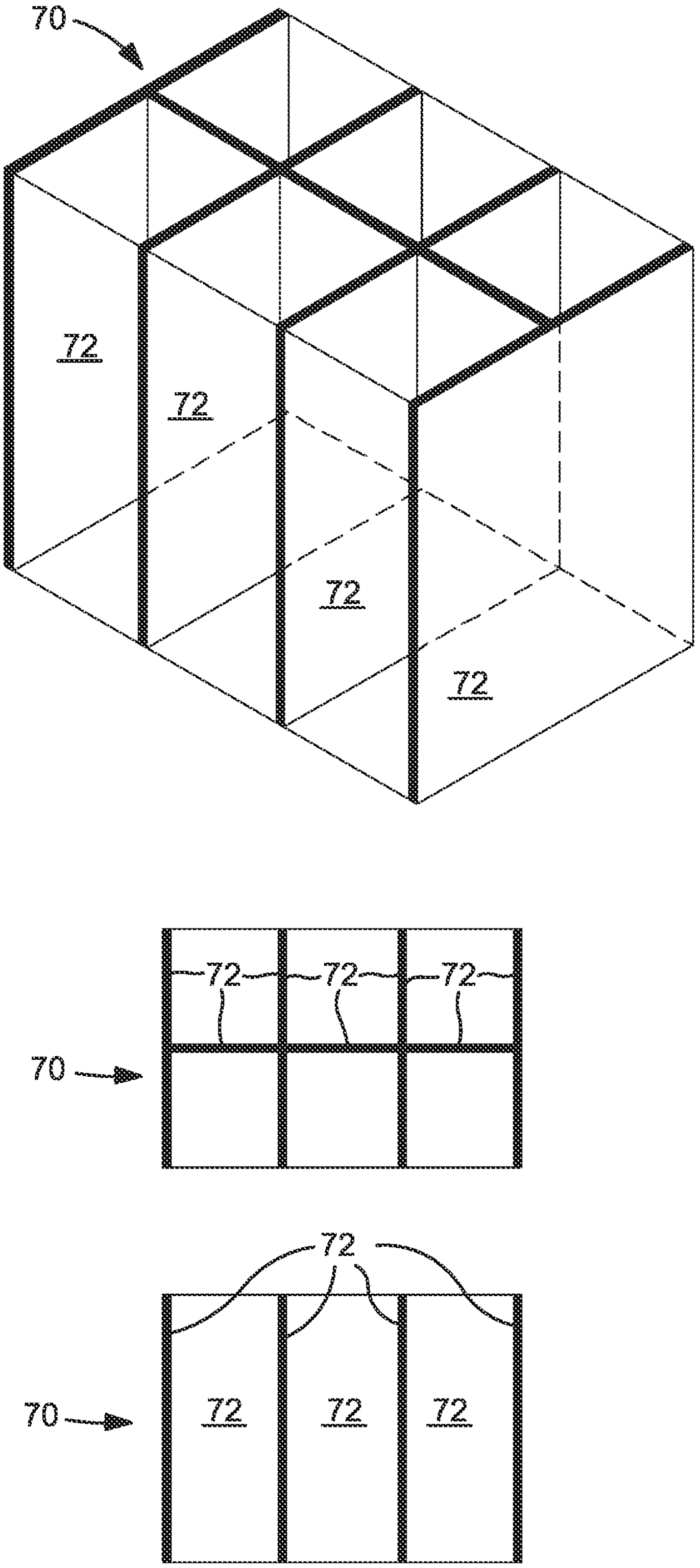
FIG. 15 is a series of illustrations of an embodiment of the invention, wherein the aerosol material is incorporated into dividers or partitions.

FIG. 15 is a series of illustrations of an embodiment of the invention, wherein the aerosol material is incorporated into dividers or partitions. Specifically, divider 70 is fabricated as a series of panels 72 which may be monolithically-formed as a single unit, e.g. by molding. Alternatively, divider 70 may be fabricated from separate panels 72 that adhesively adhered to one another. In another alternative embodiment, divider 70 may be fabricated from a single elongated larger panel 72, and a series of smaller panels 72, all of which have been appropriately molded or die-cut to have slots (not illustrated) to facilitate the larger panel and smaller panels to be interdigitated, to form a divider.

Figure 16:
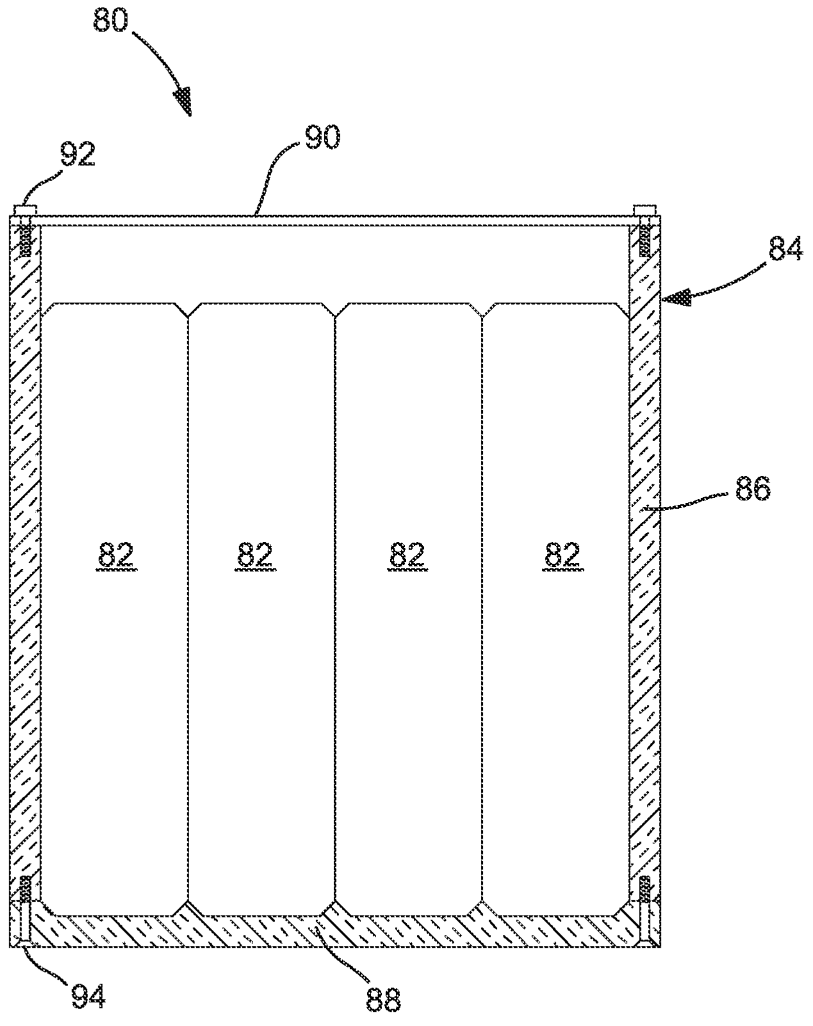
FIG. 16 is a sectional elevation of an enclosure fabricated from rigidified aerosol material, according to an embodiment of the invention.

FIG. 16 is a sectional elevation of an exemplary fire hazard 80, in the form of a plurality of batteries 82, contained within a case 84. Batteries 82 may be contained within case 84 for purposes of transportation or storage. Alternatively, case 84 may be employed to form a functional unit, wherein a plurality of batteries 82 are held together, and electrically coupled to one another. In an embodiment of the invention, case 84 comprises four sides 86, two of which are shown, a bottom 88, and a top plate 90, which may be held together via fasteners such as screws 92, 94, received in threaded bores (show but not numbered).

In the embodiment of FIG. 16, one or more of sides 86, bottom 88 and top plate 90 may be fabricated from rigidified aerosol material, as described herein. They may be machined to specific dimensions or, alternatively, may be molded, stamped, rolled, or otherwise fabricated via any suitable method. Further, fabricating the structural components of the battery pack or power supply out of enhanced resin aerosol material would enable the top, bottom, side walls, and/or internal dividers or walls to be machined, tapped for screws, bored out for other fasteners. Inasmuch as the aerosol material contemplated by the present invention is self-actuating in the presence of sufficiently high temperatures and/or active open flame, the use of such materials in the construction of the enclosures and internal structural elements of a potential fire hazard may obviate the need for sensors, sophisticated processors, and/or igniter devices to cause the aerosol-generating material to ignite and release the aerosol fire suppression substance(s). The shape and configuration of an enclosure and/or internal structural elements need not be altered.

Figure 17:
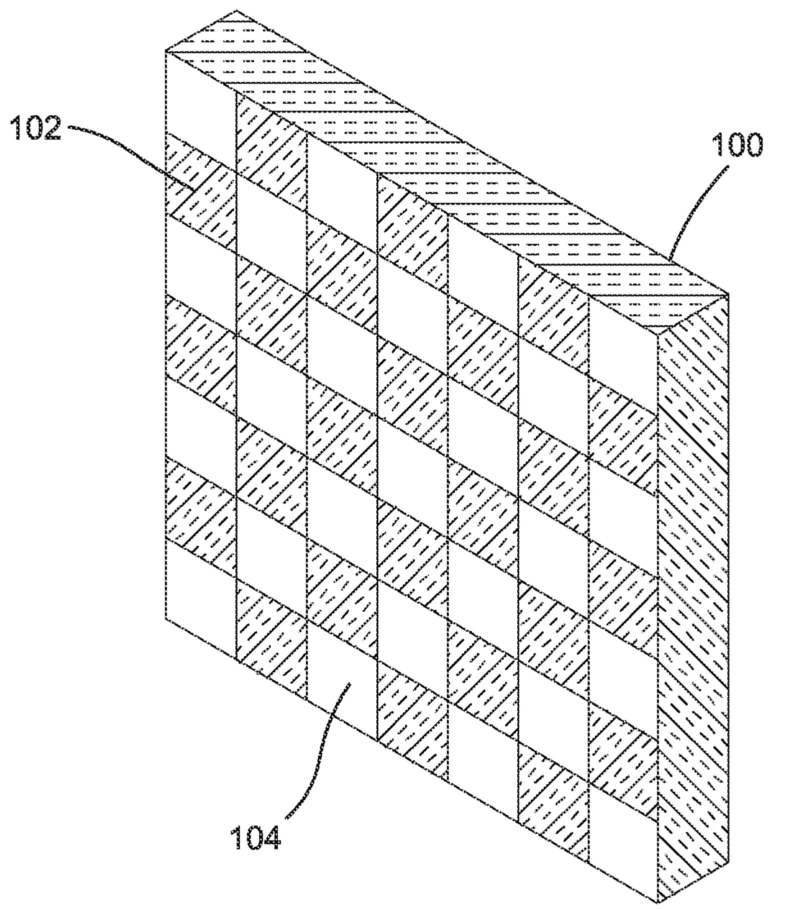
FIG. 17 is a perspective view of an aerosol panel incorporating a selectively deployed inhibiting coating to control activation of aerosol material.

FIG. 17 is a perspective view of an aerosol panel 100 wherein a base layer 102 of aerosol-impregnated resin is provided with a selectively deployed inhibiting coating 104, to control activation of aerosol material.

To control the burning further and to prevent the full surface area of the panel, sheet or coating from starting on fire too quickly, the surface of the panel, sheet or coating 102 can be painted/coated in part with an inhibitor such as ceramic paint 104. This inhibitor coating 102 could be provided in a form such as silk-screening a checker-board or similar pattern of ceramic paint 104 over the panel, sheet, or coating 102, so that when there is a large area of the panel exposed to flame, there is a limit to how rapidly the panel are actuated. This ensures that there is controlled actuation of the panels and not rapid uncontrolled actuation (which would be an explosion in the worst case scenario.). In addition to a checkerboard pattern, such as shown in FIG. 17, alternative patterns may include stripes or strips, a spiral pattern, a diamond pattern, concentric circles (similar to a bull's-eye), etc. One function that a pattern of protective material covering portions of aerosol material and exposing others is to ensure that not all of the aerosol material becomes involved in the fire immediately, and thus allows for gradual or at least controlled release of the aerosol material over time, e.g., for over a minute or more, as desired or necessary to meet the requirements of a particular implementation.

The agent material can be applied as a sheet or coating to the components before fabrication into a finished assembly, or the assembly can be sprayed or dipped with aerosol materials.

Additionally, the void spaces of an assembly can be fully or partially filled or impregnated with aerosol material by injecting aerosol materials in or around the hazard assembly. Some spaces may be left for ventilation of the assemblies.

The battery modules could have the aerosol agent provided as a lattice within the module so that sufficient aerosol agent is provided but some space may be left for ventilation of the assemblies.

In embodiments of the invention, aerosol materials can be applied within the hazard area by fully or partially coating components of the module or fully or partially coating the battery cells. Some spaces may be left for ventilation of the assemblies.

In embodiments of the invention, the structure itself of the fire hazard may be fabricated from condensed aerosol agent. For example, aerosol agent can be made ridged with the appearance and physical properties resembling a hard plastic like material. This material can be machined, stamped, molded, or otherwise shaped, so that the structure of the battery module can be made of the aerosol agent in place of metal or plastics.

In the foregoing paragraphs, further details and refinements for aerosol panels, sheets, and coatings, were discussed. The same improvements, such as ceramic coatings, sealants, insulation, and adhesives, can be employed when condensed aerosol materials are installed near, on, or inside the hazardous components or assemblies.

The aerosol emitting fire suppression systems disclosed herein are believed to provide a variety of advantages over known systems.

A. Compared to other, more traditional, fire extinguishing methods, the advantages of the invention are:

A battery fire, combined with thermal runaway is extremely difficult to extinguish and to keep out until the risk of thermal runaway has ended. Embodiments of the instant invention will extinguish very quickly and stop the thermal runaway in Li-ion battery applications, while traditional agents (dry chemicals, standard water systems, foams, carbon dioxide, etc.) will normally fail to achieve extinguishment. This exceptional performance is achieved because the extinguishing mechanism of aerosol agents is the interruption of the chemical reaction of the fire.

In addition to the performance on battery fires, embodiments of the present invention will extinguish much faster than most other agents on other types of fires beyond battery fires.

Embodiments of the present invention are self-contained, and believed to be much lower in costs, much lower weight compared to other extinguishing agents.

B. Compared to other aerosol systems using canisters, some perceived advantages of the present invention may be described as follows:

Battery fires and thermal runaway develop at a great speed. The time to detect, actuate and extinguish these fire events becomes critical. Embodiments of the present invention respond more quickly in Lithium-ion battery applications because:

Using the aerosol in panels, sheets and other assemblies allows them to be much closer to the fire when placed in an enclosure, or when located directly on the hazard that is expected to catch fire, or when installed inside the battery assembly, or when used as a coating on the actual batteries.

The spreading of the aerosol-producing agent in sheets or panels provides inherently better distribution of the agent and overcomes obstructions.

The much faster speed of operation means the aerosol will be discharging onto smaller and therefore less hazardous fires with less heat inside the batteries so the task of extinguishing and stopping the thermal runaway will be easier the earlier the agent is applied.

Embodiments of the present invention can provide high safety margins to overcome damage to the enclosure, leakage or to compensate for ventilation that may not have turned off. The amount of agent provided in a panel can easily be increased.

Embodiments of the invention will be self-contained, low in cost, very low in space requirements, very low weight, and virtually, no maintenance.

The invention has a higher level of reliability because there is no fire detection or actuation system required so there is less risk of a fault when there is less equipment.

C. Compared to other aerosol systems using small units of exposed aerosol in small frames, the advantages of the invention are:

The invention does not require a frame or holding assembly because the agent can be provided as solid rigid panels, flexible sheets, etc. that can be glued to the enclosure, mounted on the hazard or impregnated in the hazard, or applied as a coating. Additionally, the agent can be machined or formed to provide the fabricated elements of the hazard.

The size and shape of the invention components can be provided to suit each application. The invention provides a much higher level of flexibility in its installation.

The invention will be much faster to operate and extinguish fire and it is especially important to have rapid extinguishment before the fire increases and makes the thermal runaway even more difficult. A few seconds in response time becomes extremely important.

The higher safety margins inherent with the invention allow the aerosol agent to overcome leakage and continue protection by preventing a re-flash of a fire until the remains of the batteries have cooled which will terminate the thermal runaway hazard.

Even compared with these small units fitted to frames, the invention offers greater flexibility in installation, much faster actuation and extinguishing times, better agent distribution and the ability to overcome difficult obstructions, lower costs, lower weight/space and no maintenance.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein. For example, while the present disclosure may place emphasis on use of the products, systems and methods in the environment of battery fire hazards, specifically Li ion battery fire hazards, it is to be understood that the scope of the invention is not so limited, and that the principles described and illustrated herein may be applied to other types of fire hazards.

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A fire suppression system comprising:

A condensed pyrotechnically-generated aerosol material disposed on, or in physical proximity to, a potential fire hazard, wherein the condensed pyrotechnically-generated aerosol material is capable of being directly actuated solely via direct exposure to one of flame, or heat above a predetermined level;

wherein the condensed pyrotechnically-generated aerosol material is configured to be actuated by exposure to at least one of heat or flame, to produce an aerosol material having components having a greater affinity for a combination with fire fuel chemical components, than an affinity for ambient oxygen to combine with fire fuel chemical components, to produce chemical components having a lesser tendency to combust;

wherein the condensed pyrotechnically-generated aerosol material is in the form of at least one of:

a body of material fabricated solely of an aerosol fire suppression substance, one of affixed to a surface of a potential fire hazard or disposed in physical proximity to, the potential fire hazard; or a coating applied to the surface on, or in physical proximity to the potential fire hazard.

2. The fire suppression system according to claim 1, wherein the body of material is one of flexible, rigid, a combination thereof; and has a shape that is one of a cylinder, a pyramid, a prism, a rectangular parallelepiped, a sphere, an asymmetrical shell, a combination thereof; and is one of hollow, solid-through, solid but porous throughout; a combination thereof.

3. The fire suppression system according to claim 2, wherein the aerosol fire suppression substance comprises at least one of potassium nitrate; potassium carbonate; epoxies or organic resins; dicyandiamide (DCDA); magnesium.

4. The fire suppression system according to claim 1, further comprising at least one of:

an initiator operably coupled to the aerosol material to facilitate actuation of the aerosol fire suppression substance;

a fire detector operably coupled to the initiator, to actuate the initiator, upon detection of at least one of heat in excess of a predetermined temperature, flame, combustion products in excess of a predetermined concentration, combustion products having at least predetermined constituent;

a control apparatus coupled to the initiator and the aerosol material, wherein the control apparatus comprises at least one of a manual actuator to enable the initiator to be selectively actuated by a person, and a programmable apparatus configured to actuate an initiator, upon detection of at least one of heat in excess of a predetermined temperature, flame, combustion products in excess of a predetermined concentration, combustion products having at least predetermined constituent.

5. The fire suppression system according to claim 4, wherein the potential fire hazard comprises at least one of a device and a process system, and the control apparatus is coupled to a monitoring apparatus that monitors operation of the device.

6. The fire suppression system according to claim 1, further comprising wherein the aerosol material is in the form of a body of material impregnated with an aerosol fire suppression substance, and wherein a layer of protective material is disposed on a side of the body to be positioned facing a fire hazard, the layer of protective material being disposed in a pattern such that portions of the body of material impregnated with aerosol fire suppression substance is exposed.

7. The fire suppression system according to claim 1, wherein the aerosol material further comprises:

at least two layers of aerosol fire suppression substance; wherein the aerosol fire suppression substance of a first layer is different from an aerosol fire suppression substance of a second layer.

* * * * *